United States Patent [19]

De Bei

[11] Patent Number: 5,385,361
[45] Date of Patent: Jan. 31, 1995

[54] SHOCK ABSORBER DEVICE PLACED IN THE REAR PART OF A BICYCLE

[76] Inventor: Claudio De Bei, Vicolo Bonamigo, 7, Bassano Del Grappa (Vicenza), Italy

[21] Appl. No.: 964,414

[22] Filed: Oct. 21, 1992

[30] Foreign Application Priority Data

Oct. 23, 1991 [IT] Italy .................. VI91 A 000161

[51] Int. Cl.6 .................................. B62K 25/28
[52] U.S. Cl. .................... 280/284; 280/283; 280/288
[58] Field of Search ......... 280/284, 285, 283, 288; 180/227

[56] References Cited

U.S. PATENT DOCUMENTS

| 612,337 | 10/1898 | Hall ..................... 280/284 |
| 1,106,867 | 8/1914 | Freund ................. 280/284 |

FOREIGN PATENT DOCUMENTS

| 411696 | 5/1945 | Italy ..................... 280/284 |
| 313074 | 3/1956 | Switzerland ........... 280/284 |
| 16825 | 10/1919 | United Kingdom .... 280/284 |

*Primary Examiner*—Eric Culbreth
*Assistant Examiner*—Anne Marie Boehler
*Attorney, Agent, or Firm*—Bucknam and Archer

[57] ABSTRACT

The shock absorber device comprises a flexible absorber placed within the tube (1) which supports the sleeve holding the saddle. The rear fork is pivoted corresponding to its front extremities to the lower part of the front tubular structure (9) of the frame. The two arms of the fork, corresponding to their intermediate part, are pivoted to a pin fixed to the extremity of the shaft of the shock absorber. Two slits are formed in the tube (1) so that the pin may slide through the slits.

3 Claims, 2 Drawing Sheets

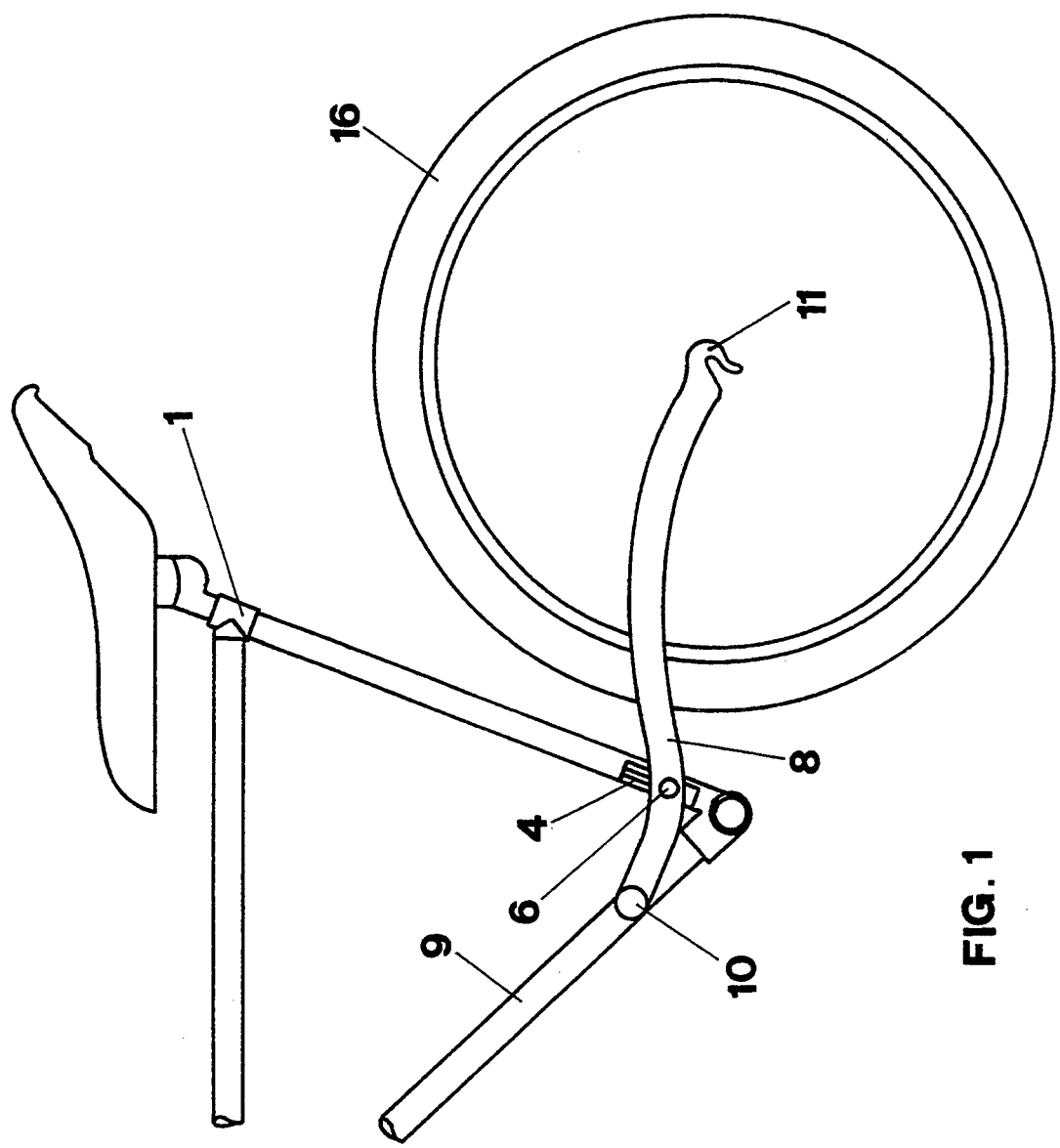

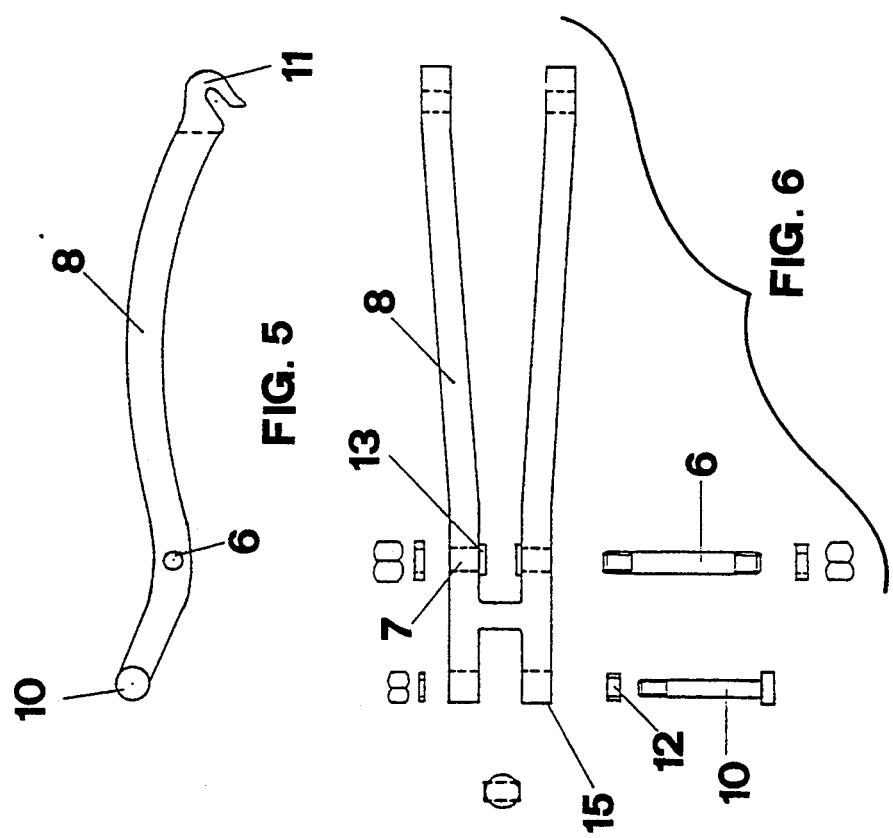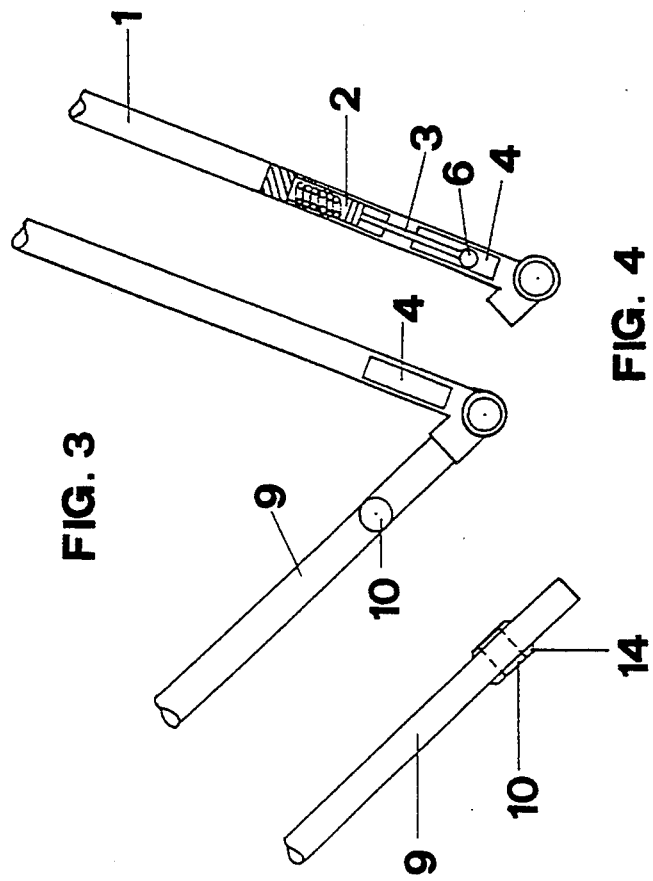

SHOCK ABSORBER DEVICE PLACED IN THE REAR PART OF A BICYCLE

The present invention relates to a shock absorber device to be used in the rear part of a bicycle.

It is known that recently there has been a substantial use of the bicycle of the type known as "mountain bike" both for pleasure as well as for athletic contests. These bicycles comprise a particular structure of the frame and the handle bar as well as such a conformation of the pneumatic members to allow to the user the utilization of the bicycle also on difficult grounds.

In addition to the bicycle mentioned hereinabove, there are used also the so-called "city bike" which offers some features intermediate between conventional bicycles and the features of the above mentioned mountain bike. In every case, the utilization of the bicycle has increased substantially both of the two types discussed hereinabove as well as the conventional types on difficult grounds or on roads which are not covered by asphalt.

The necessity of making it easier for the user to use a bicycle on difficult grounds is clear. However, with the present state of the art, there has been a limitation and only in a few rare cases of applying on the frame of the bicycle some devices operating as shock absorbers which constitute essentially adaptation on a reduced scale of the devices normally used on motorcycles and cyclomotors which, as it is well known, are generally of the hydraulic type or require a spiral spring. Practically, these devices, as far as they are used on bicycles, turn out to be expensive, take a lot of space and are heavy and for this reason are used to a very small extent.

One object of the present invention is to provide a shock absorber to be used in the rear part of the bicycle which is free of the drawbacks mentioned hereinabove so that the user may use them efficiently without incurring the problems which have substantially limited the use of the known shock absorbers on bicycles.

The crux of the present invention resides in providing on the frame of the bicycle a flexible shock absorber located within the tube which supports the sleeve of the saddle. Further the fork of the frame is pivoted corresponding to its front extremities to the lower part of the front tube of the frame. Finally, the two arms of the fork are pivoted to another pin which is fixed to the extremity of the shaft of the shock absorber.

By means of the device of the present invention, the user has the possibility of achieving an effective shock absorption corresponding to the rear part of the bicycle by means of a member which appears practically invisible from the exterior, which works properly, and which in view of the fact that it is located in the interior of the tubular member of the frame is in addition protected against eventual damages caused for instance by dust and by atmospheric conditions.

The dependent claims attached hereto cover particular forms of realization of the invention which are suitable to make the device particularly effective, always workable for the user.

The invention will be described hereinbelow in detail according to a particular embodiment by way of an example which is not intended to be limitative by reference to the accompanying drawings of which:

FIG. 1 illustrates a schematic overall view of the device of the present invention;

FIGS. 2, 3 & 4 illustrate respectively a side view, a front view and a longitudinal cross-sectional view of the tubular element within which the shock absorber is located; FIG. 3 also illustrates a further tubular member fixed to the first tubular member;

FIG. 5 illustrates a side view of the fork used in the device of the present invention;

FIG. 6 illustrates a planar top view of the fork and some accessory members used in the device of this invention.

The figures show that the device is capable of being applied to the frame of a bicycle and is contained in the interior of the tubular element 1 which supports the sleeve supporting the saddle, a shock absorber 2 of a well known type which comprises shaft 3 turned downwardly.

This shock absorber may be of the type requiring a spiral spring as shown in the figure or could be of the hydraulic type or similar types.

Corresponding to the extremity of the shaft on the tubular element 1 there are formed two slits 4 for the purpose of permitting the passage of pin 6 which is fixed to this extremity and which further is inserted within suitable seats 7 formed on the fork 8 of the bicycle frame. This pivoting occurs corresponding to the intermediate part of the fork while, corresponding to seats 15 which are formed on the front extremities of the fork, the fork is pivoted to the lower tubular part 9 of the frame by means of another pin 10. By means of well known members, the rear extremities 11 of the fork are conformed in such a manner that they are permitted to go around the hub of the rear wheel 16. Advantageously around pin 10 there are placed rolling bearings 12 while, corresponding to the internal mouths of seats 7, there are placed sliding blocks 13 made of resistant anti-friction material which are intended to slide along the borders of slits 4. In addition, advantageously, along the borders of seats 15 of pin 10 there are used annular projections 14 as shown in FIG. 2. The fork 8 is free of connection with the pedal.

It is evident that in response to the irregularities of the ground on the wheels, the fork 8 oscillates due to the fact that the pin 6 has the possibility of sliding within the slits 4. Naturally the motions of the fork will be deadened by shock absorber 2.

In view of what has been said hereinabove, it is clear that the device of the present invention is capable of satisfying the objects mentioned hereinabove. Particularly the attached figures show that the frame is practically indistinguishable from the exterior with respect to known frames of bicycles with many advantages for the user from the point of view of functionality and practical use in addition to the aesthetic appearance.

What is claimed is:

1. A bicycle which has a frame said frame having a front part (9) and a rear part, a saddle, a sleeve supporting said saddle, a fork (8) in said rear part of the frame, a tubular member (1) supporting said sleeve, said front part of said frame (9) having a lower extremity, said fork (8) having a front part, a rear part (11) and two arms, said arms having an intermediate part, a shock absorber device (2), having a shaft (3), said shaft having a lower part, said shock absorber device (2) being placed within said tubular member (1) which supports said sleeve, said fork (8) being pivoted at a point corresponding to its front part to said lower extremity of said front part (9) of said frame by means of a first pin (10), said intermediate part of said arms being pivoted to a second pin (6), said second pin being fixed to said lower part of said shaft (3) of said shock absorber, two slits (4) being formed corresponding to said lower part of said shaft (3), said slits having an interior and being counterplaced in said tubular member (1) whereby said second pin (6) goes through said slits, said second pin (6) sliding in said interior of said slits in response to the irregularities of the ground upon which said rear wheel of the bicycle travels; said fork (8) being free of connection with the pedal.

2. The bicycle according to claim 1 which comprises first seats (7) formed on the intermediate part of said arms and second seats (15) formed on the front part of said fork, said second pin (6) being inserted in said seats (7), said fork being pivoted to the lower portion of said front part of the frame (9) corresponding to said seats (15) and rolling bearings (12) disposed within said seats (15) embrace said first pin (10).

3. The shock absorption device according to claim 2 wherein said first seats (7) have internal mouths, said shock absorber device comprises sliding blocks (13) positioned around said internal mouths of said first seats (7) formed in the rear part of said fork (8), said sliding blocks (13) being made of antifriction material, said sliding blocks sliding along the interior of said slits (4).

* * * * *